United States Patent
Diamant et al.

(10) Patent No.: US 10,333,708 B1
(45) Date of Patent: Jun. 25, 2019

(54) HYBRID RANDOM-NUMBER GENERATOR

(71) Applicant: AMAZON TECHNOLOGIES, INC., Seattle, WA (US)

(72) Inventors: Ron Diamant, Albany, CA (US); Matthew John Campagna, Bainbridge Island, WA (US); Colm Gearóid MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/424,334

(22) Filed: Feb. 3, 2017

(51) Int. Cl.
H04L 29/06 (2006.01)
H04L 9/08 (2006.01)
G06F 21/72 (2013.01)
G06F 7/58 (2006.01)

(52) U.S. Cl.
CPC ........... H04L 9/0869 (2013.01); G06F 7/588 (2013.01); G06F 21/72 (2013.01); H04L 2209/12 (2013.01)

(58) Field of Classification Search
CPC .................................................. H04L 9/0869
See application file for complete search history.

(56) References Cited

U.S. PATENT DOCUMENTS

| | | | | |
|---|---|---|---|---|
| 8,345,871 B2* | 1/2013 | Balfanz | ................. | H04L 9/3263 332/100 |
| 8,595,277 B2* | 11/2013 | Goettfert | ............... | H04L 9/0861 708/250 |
| 10,114,572 B2* | 10/2018 | Chang | .................... | G06F 9/5011 |
| 2002/0067785 A1* | 6/2002 | Tanahashi | ............. | H03L 7/0814 375/354 |
| 2006/0064448 A1* | 3/2006 | Henry | ........................ | G06F 7/58 708/250 |
| 2011/0106870 A1* | 5/2011 | Dragone | ................. | G06F 7/588 708/255 |
| 2015/0055778 A1* | 2/2015 | Cox | ....................... | H04L 9/0662 380/46 |
| 2016/0012252 A1* | 1/2016 | Deleeuw | ............. | G06F 21/6254 726/26 |
| 2017/0034167 A1* | 2/2017 | Figueira | ............... | H04L 63/0428 |
| 2017/0203198 A1* | 7/2017 | Lysowski | ................. | A63F 1/00 |
| 2018/0095729 A1* | 4/2018 | Greiner | .................... | G06F 7/588 |
| 2018/0375650 A1* | 12/2018 | Legre | .................... | H04L 9/0858 |

OTHER PUBLICATIONS

Intel, "Intel Digital Random No. Generator (DRNG)," Software Implementation Guide, Aug. 7, 2012, 35 p.

* cited by examiner

*Primary Examiner* — Ali Shayanfar
(74) *Attorney, Agent, or Firm* — Blank Rome LLP

(57) ABSTRACT

A system includes a first entropy-based random number generator (RNG) circuit configured to produce a bit stream and a key generator configured to generate encryption keys using bits from the bit stream. The system also includes an encryption engine configured to encrypt bits from the bit stream and a de-multiplexer configured to receive the bit stream from the first entropy-based RNG circuit and to provide a first set of bits from the bit stream to the key generator for generation of an encryption key and a second set of bits from the bit stream to the encryption engine for encryption to produce an encrypted output value.

19 Claims, 5 Drawing Sheets

HYBRID RANDOM-NUMBER GENERATOR

BACKGROUND

The security of many systems, such as cryptographic systems, relies on unpredictability and irreproducibility of digital key-streams that are used for encryption and/or signing of confidential information. There are at least two fundamentally different strategies for generating random bits. One strategy is to compute numbers deterministically using, for example, a software-implemented algorithm that requires an initial input seed value. This class of random number generators may be known as deterministic random number generators (DRNGs) pseudo random number generators (PRNGs). DRNGs must be provided with a random initialization value (seed) to produce an output value that resembles a random bit-stream. PRNGs are periodic, although the periods are typically very long.

Another strategy is to produce bits non-deterministically, where every bit of output is based on a physical process that is unpredictable. Such physical processes may be based, for example, on the production of thermal (resistance or shot) noise. This class of random number generators (RNGs) may be referred to as true random number generators (TRNGs). True random number generators may experience temporary failures in which the TRNG circuit's ability to harvest entropy is reduced. Such failures may result from cross-capacitance due to neighboring circuits, temperature variations, etc. Some implementations may include logic that further processes the output bit stream from the TRNG to alleviate these sorts of failures. However, these post processing logic units may themselves experience failures. For example, a Von-Neuman corrector may be incapable of generating any output if the TRNG supplies the corrector a stream of N 0's (N is greater than 1). An entropy accumulator can be used which determines an exclusive-OR of the output of multiple TRNG circuits. However, an entropy accumulator may be relatively slow.

BRIEF DESCRIPTION OF THE DRAWINGS

For a detailed description of various examples, reference will now be made to the accompanying drawings in which.

DETAILED DESCRIPTION

The disclosed embodiments are directed to a hybrid random number generator system that comprises a true random number generator (TRNG) circuit coupled to a deterministic random number generator (DRNG). The TRNG circuit generates a stream of random bits which are provided to the DRNG, and a subset (or all) of the random bits from the TRNG circuit are encrypted by the DRNG to produce an encrypted random output value. The encrypted random output value may be used as part of a cryptographic operation such as a digital signature computation or verification, encryption, decryption, etc. For example, the encrypted random output value from the disclosed hybrid random number generator system may be used as an encryption key.

The DRNG may include a de-multiplexer, an encryption engine, and a key generator. The de-multiplexer receives the bit stream from the TRNG circuit and provides a first set of bits from the bit stream to the key generator for generation of an encryption key and a second set of bits from the bit stream to the encryption engine for encryption to produce the encrypted random output value. In some embodiments, the de-multiplexer includes a first buffer and a second buffer and distributes the random bit stream among the first and second buffers. For example, the de-multiplexer may provide N bits of the bit stream to the first buffer for every M bits of the bit stream provided by the de-multiplexer to the second buffer. The bits from the first buffer are provided to the key generator for generation of encryption keys. The bits from the second buffer are provided to the encryption engine for encryption using an encryption key generated by the key generator.

The values of N and M are configurable within the demultiplexer, and different combinations of N and M can balance encryption quality versus performance as desired. In one example, the encryption engine may implement advanced encryption standard (AES) encryption with cipher block chaining (CBC). By implementing CBC, the DRNG iteratively determines the exclusive-OR operation of a block of bits from the TRNG circuit and a previous output from the encryption engine to produce input data to the encryption engine. The input data is then encrypted by the encryption circuit using the encryption key from the key generator. The encrypted output is then exclusive-OR'd with the next block of bits from the TRNG circuit to produce new input data to the encryption, and so on.

The key generator may be initialized with an initialization value as an initial encryption key to be used by the encryption engine. From that point on, a new encryption key is determined by the key generator as, for example, the exclusive-OR of the current encryption key and a set of bits from the de-multiplexer (a set of bits that originated from the TRNG circuit).

Figure 1:
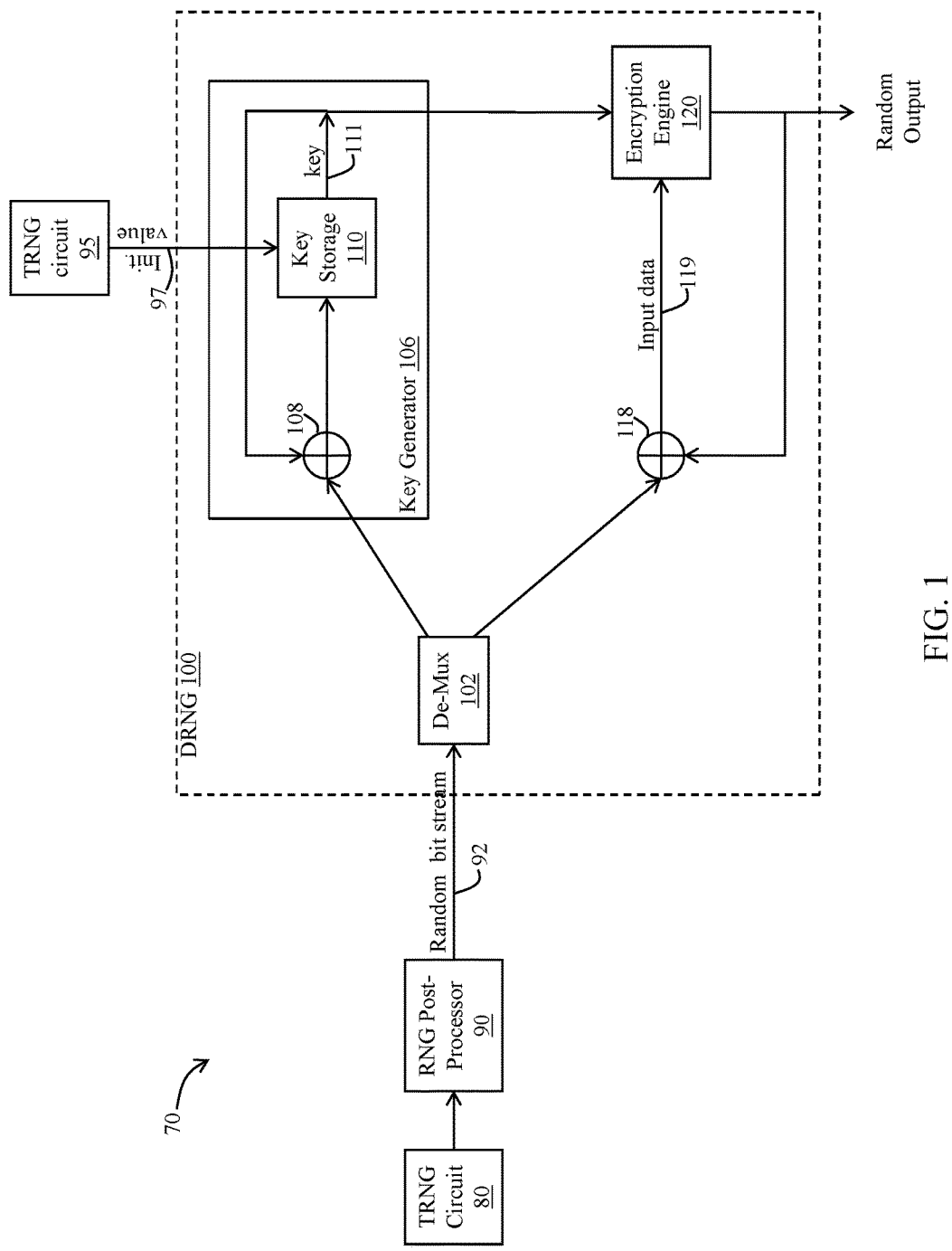
FIG. 1 shows a system in accordance with various examples.

FIG. 1 shows an example of a random number generation system 70. The system 70 includes a TRNG circuit 80, an RNG post-processor 90, and a DRNG 100. The DRNG 100 includes a de-multiplexer 102, a key generator 106, an encryption engine 120, and exclusive-OR logic 118. The system 70 also may include another TRNG circuit 95 to provide an initialization value to the key generator 106. The system 70 may be implemented as an integrated circuit (IC) such as an application-specific integrated circuit (ASIC), a system-on-chip (SoC), a field programmable gate array (FPGA), or other types of devices.

Figure 2:
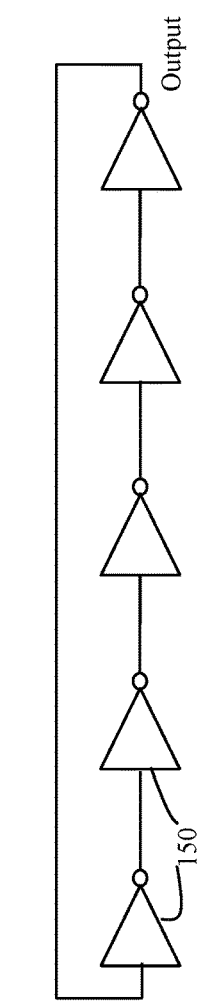
FIG. 2 shows an example of a true random number generator circuit implemented using a ring oscillator.

The TRNG circuit 80 can be implemented as any suitable type of TRNG circuit. The TRNG circuit generates a random output bit stream using entropy harvested from a physical source. Thus, the TRNG circuit may be referred to as entropy-based TRNG circuit. In one example, the TRNG circuit 80 may comprise a ring oscillator. A ring oscillator, such as that illustrated in FIG. 2, may include a series connected chain of inverters 150 in which the output of each inverter is connected to the input of the next inverter in the chain thereby forming a loop. Ring oscillators typically have an odd number of inverters (5 inverters in the example of FIG. 2), which causes the output of any given inverter to oscillate between high and low signal levels. The period of oscillation of the ring oscillator vibrates in a random manner. The period can be represented as T=T+T', where T' is a random value. The random variation of the period can be used to generate a random bit sequence by sampling the output of the ring oscillator.

Figure 3:
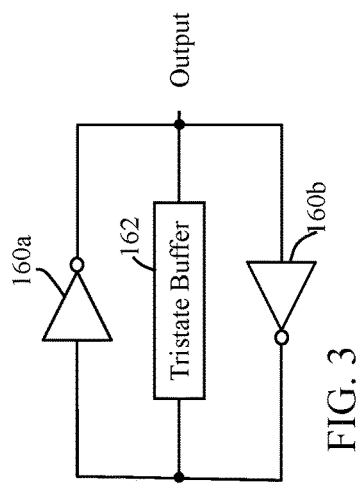
FIG. 3 shows an example of a true random number generator circuit implemented using a bistable cell.

Another example of a TRNG circuit is a bistable cell. An example is shown in FIG. 3. A bistable cell includes a pair of inverters 160a, 160b connected in a loop. Through operation of additional circuit components such as tristate buffer 162, a bistable cell can be forced into a metastable state in which the output of each inverter 160a, 160b is at an intermediate voltage value between a logic low level and a logic high level, and thus is neither a valid 0 nor a valid 1. When the metastable state is released by the tristate buffer 162, the cell collapses to a stable state at valid logic levels in which the output of one inverter is a 1 and the output of the other inverter is a 0, or vice versa. Bistable cells randomly collapse to a [1,0] state or a [0,1] state due to, for example, thermal noise internal to the cell.

Returning to FIG. 1, the output of the TRNG circuit 80 may comprise a random bit stream in which there is little or no correlation between bits in the bit stream. The RNG post-processor 90 may be included to further process the random bit stream from the TRNG circuit 80. Such processing may be useful to mitigate momentary failures in the TRNG circuit which may happen for various reasons such as cross-capacitance from nearby circuits, temperature variations, etc. Also, post processing may help to guarantee a certain bitrate. That is, even if there is not enough entropy in the TRNG circuit to generate a sufficiently random bit(s), the RNG post-processor 90 may still be able to produce random or pseudo random bits at the desired bit rate.

One type of post-processing that may be implemented within the RNG post-processor 90 is a Von-Neumann corrector, but other types of processing can be implemented as well such as Entropy Accumulation. The output bit stream from the TRNG circuit 80 may have a bias in which, for example, a 0 may be more likely to follow the generation of a previous 0 (or a 1 may tend to follow a 1). The Von-Neumann corrector removes the bias from the TRNG circuit's bit stream by taking one of three actions: (1) discarding two successive bits that are equal (0,0 or 1,1); (2) replacing a sequence of 1,0 with a 1; and (3) replacing a sequence of 0,1 with a 0. Another example of an RNG post-processing technique is an entropy accumulator in which the TRNG circuit 80 may comprise multiple entropy-harvesting circuits (e.g., multiple ring oscillators coupled in parallel) coupled to an XOR tree. The sampled outputs of the various entropy-harvesting circuits may be XOR'd together to produce the next bit of the random bit stream. The RNG post-processor 90 may implement other types of processing techniques as well.

The output of the RNG post-processor 90 is designated in FIG. 1 as the random bit stream 92, which is then provided to the DRNG 100. The random bit stream 92 provided to the DRNG 100 may be the output bit stream directly from the TRNG circuit 80 in implementations that do not have an RNG post-processor 90, or may be the output from the RNG post-processor 90 if such a post-processor is indeed present. That is, the output of the TRNG circuit 80 is a random bit stream and the output of the RNG post-processor also is a random bit stream, and either bit stream may be used as the input bit stream to the DRNG 100.

The TRNG circuit 80 may be implemented in hardware and examples of such hardware are provided above (inverter-based ring oscillators and bistable cells). The RNG post-processor 90 may be implemented as a discrete hardware circuit or as microcontroller or other type of programmable hardware processor executing machine instructions. The various components of the DRNG 100 may be implemented as discrete circuits or as a microcontroller or other type of programmable hardware processor executing machine instructions.

In the embodiment of FIG. 1, the de-multiplexer DRNG 102 within the DRNG 100 receives the random bit stream 92 from the RNG post-processor 90 and thus indirectly from the TRNG circuit, or in other embodiments the de-multiplexer DRNG 100 receives the random bit stream directly from the TRNG circuit 90. The de-multiplexer 102 is configured to provide some bits from the random bit stream 92 to the key generator 106 and other bits from the random bit stream 92 to the encryption engine 120. Examples of how the bits of the random bit stream are allocated between the key generator 106 and the encryption engine 120 are described below and with respect to FIGS. 4 and 5. The de-multiplexer 102 is configured to provide N bits of the random bit stream for use by the key generator for every M bits of the bit stream 92 provided for encryption by the encryption engine 120. The values of M and N may be configurable.

In the example of FIG. 1, the key generator 106 includes exclusive-OR logic 108 coupled to key storage 110. The key storage 110 may include memory, a hardware register, or other form of storage. The exclusive-OR logic 108 determines an exclusive-OR of two input values—one input value comprising bits from the random bit stream 92 via the de-multiplexer 102 and the other value being the key stored in the key storage 110. The exclusive-OR operation performed by the exclusive-OR logic 108 may be a bitwise exclusive-OR operation of the two input values. The resulting value from the exclusive-OR logic 108 represents a new key and may be stored in the key storage 110 overwriting the previous key. The key 111 from the key storage 110 is used by the encryption engine 120 to encrypt some of the bits from the random bit stream 92 provided by the de-multiplexer 102. In this example, an exclusive-OR operation is performed by exclusive-OR logic 108, but other embodiments may implement exclusive-NOR logic or other types of logical operator circuits.

Figure 4:
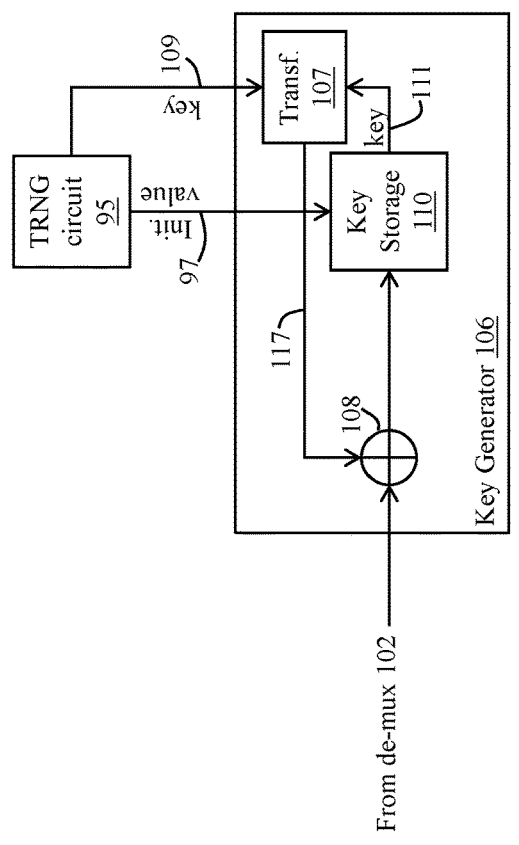
FIG. 4 shows an example of a key generator.

In the example of FIG. 1, the exclusive-OR logic 108 computes the exclusive-OR operation of bits from the de-multiplexer 102 and the key from the key storage 110. In another embodiment, the key from the key storage 110 may be transformed to a new value before providing it to the exclusive-OR logic 108. FIG. 4 shows a transformation circuit 107 that transforms the key 111 from the key storage and provides the transformed output value 117 to the exclusive-OR logic 108. The transformation circuit may, for example, encrypt the key 111 from the key storage using a key provided by the TRNG circuit 95 (or TRNG circuit 80). Other types of transformations are possible as well.

Referring back to FIG. 1, the key generator 106 may use an initial value 97 as its initial key for storage in key storage 110, which may then be exclusive-OR'd with the initial bits provided by the de-multiplexer 102. The initial value 97 may be generated by TRNG circuit 95 which may be a separate TRNG circuit from TRNG circuit 80. In other embodiments, an initial set of bits from TRNG circuit 80 may be used as the initial value 97. In embodiments in which TRNG circuit 95 is used to provide the initial value 97 to the key generator, while TRNG circuit 80 is used in an iterative process to generate new encryption keys as described above, the TRNG circuits 80 and 95 may be implemented as the same or different type of TRNG circuit. For example, both circuits 80 and 95 may be implemented as ring oscillator-based circuits, bistable cells-based circuits, etc. However, one of the circuits 80, 95 may comprise a ring oscillator-based circuit, while the other circuit 80, 95 may comprise a bistable cell-based circuit. Other types of entropy-harvesting circuits can be used to implement either or both of the TRNG circuits 80, 95.

The encrypted output from the encryption engine 120 represents the random output value of the random number generation system 70. The random output value from the encryption engine 120 also is provided to exclusive-OR logic 118. Another input to the exclusive-OR logic 118 comprises bits selected from the random bit stream 92 via the de-multiplexer 102. The exclusive-OR operation performed by the exclusive-OR logic 118 may be a bitwise exclusive-OR operation of the two input values. The resulting value from the exclusive-OR logic 108 is designated as "input data" 119 to the encryption engine 120. The encryption engine 120 encrypts the input data 119 using the key from the key storage 110. The DRNG 100 thus performs a type of cipher block chaining in which the encryption engine iteratively performs an encryption of a previously encrypted value combined with new data (e.g., random output from encryption engine 120 exclusive-OR'd with bits from the de-multiplexer 92). The encrypted input data can then be used as a random value for other operations such as encryption, decryption, digital signature computation and verification, etc. In this example, an exclusive-OR operation is performed by exclusive-OR logic 118, but other embodiments may implement exclusive-NOR logic or other types of logical operations.

Figure 5:
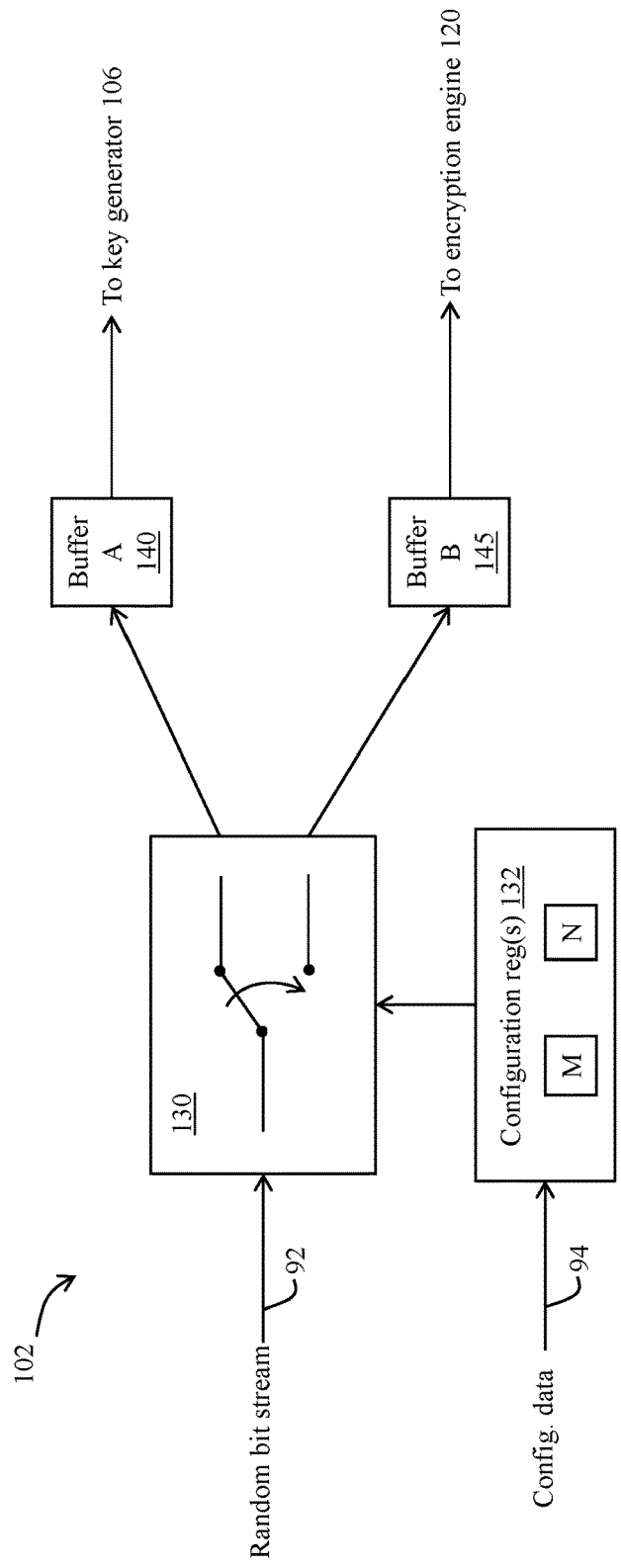
FIG. 5 shows a block diagram of the de-multiplexer of FIG. 1 in accordance with various examples.

FIG. 5 illustrates an example of the de-multiplexer 102. In this example, the de-multiplexer 102 includes switch logic 130, a configuration register 132 (or multiple configuration registers 132), a buffer A 140 and a buffer B 145. The random bit stream 92 is provided to the switch logic 130 and through the switch logic to either buffer A or buffer B for storage therein. The switch logic 130 may include a state machine or other circuit (not shown) that operates a switch to distribute a given bit from the input random bit stream to either of the buffers A or B.

The configuration registers 132 may store the values of M and N noted above, or other values, that configure the switch logic 130 to distribute the correct relative number of bits to each buffer A and B and thus to the respective key generator 106 and encryption engine 120. The values programmed into the configuration registers may be programmed via a control channel input to the random number generation system 70 or from the RNG post-processor 90 (as described below) as configuration data 94. In one example, M may be 1 and N may be 1 (or other equal integers) meaning that for each bit provided to buffer A, a bit also is provided to buffer B. That is, equal numbers of bits from the random bit stream 92 are distributed to each buffer. The values programmed into the configuration registers 132 may be, for example, a value of 2 for N and 1 for M. In this example, for every 2 bits distributed to buffer A (and thus used for the key generator 106), 1 bit is stored in buffer B for use by the encryption engine 120.

Once a sufficient number of bits is stored in buffer A for use to compute a key, the contents of buffer A is provided to the exclusive-OR logic 108 of the key generator for computing an exclusive-OR of that value with the current value of the key from key storage 110. For example, if 128 bit encryption is desired, then once 128 bits from the random bit stream 92 is stored in buffer A, the 128 bit value from buffer A is exclusive-OR'd with the current key to compute a new encryption key for storage in the key storage 110. Similarly, the contents of buffer B is provided to exclusive-OR logic 118 to compute a new input data value to be encrypted by encryption engine 120.

Figure 6A:
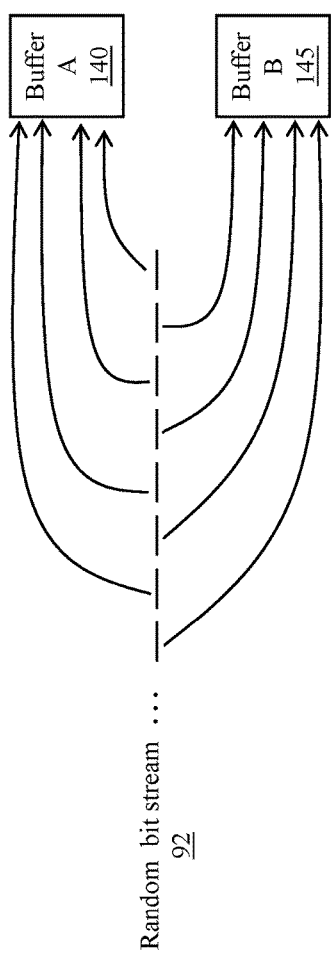
FIGS. 6A and 6B illustrate various examples of the operation of the de-multiplexer.
Figure 6B:
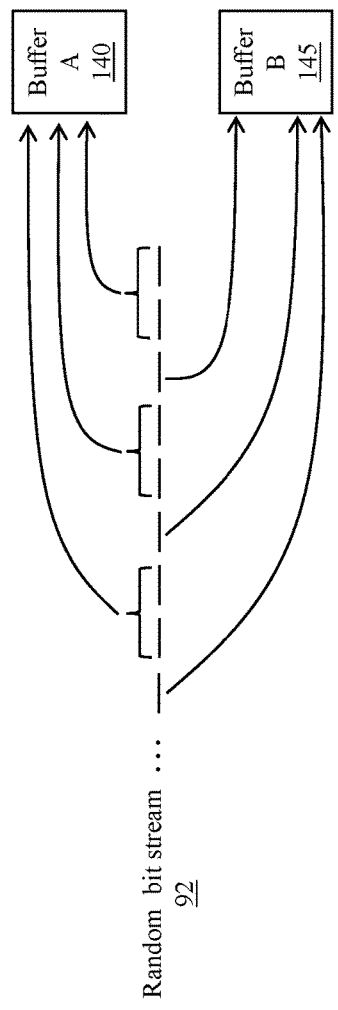

FIGS. 6A and 6B illustrate the operation of the de-multiplexer 102 for two different configurations. In the example of FIG. 6A, the de-multiplexer 102 has been configured to distribute equal proportions of bits from the random bit stream 92 to each of the buffers A and B. In the example shown, every other bit may be distributed through switch 130 to buffer A, with the remaining bits distributed to buffer B (i.e., N=M=1). In other implementations, a number of consecutive bits (e.g., 2, 3, 4, etc.) may be distributed to buffer A, with an equal number of consecutive bits distributed to buffer B. In the example of FIG. 6B, for every 2 bits distributed to buffer A, one bit is distributed to buffer B (i.e., N=2 and M=1).

Referring again to FIGS. 1 and 2, the encryption engine 120 may be configured to encrypt blocks of data of a particular size. In one example, the encryption engine 120 may implement AES encryption in which individual blocks of 16 bytes of input data 119 are encrypted. Thus, once the buffer B includes 16 bytes of bits from the random bit stream 92 (or whatever amount of data is applicable to the encryption protocol implemented by the encryption engine 120), the contents of buffer B is output from the buffer B and exclusive-OR'd by exclusive-OR logic 118 with the previous encrypted output from the encryption engine 120.

The encryption key 111 from key storage 110 may be of any of various sizes (e.g., 128 bits, 192 bits, 256 bits, etc.). Once buffer A includes the number of bits from the random bit stream 92 that matches the designated size of the encryption key to be used during the encryption process, the contents of buffer A are provided to exclusive-OR logic and exclusive-OR'd with current value of the encryption key 111 to produce a new encryption key. The newly computed encryption key is then stored in key storage 110.

By being able to configure the de-multiplexer 102 to allocate a desired portion of the bits from the random bit stream 92 to the key generator 106 to generate an encryption key 111, the quality of the encryption performed by the encryption engine 106 can be controlled. Larger encryption key sizes enables higher quality encryption of the input data 119 (making it more difficult to decrypt the data without the encryption key), and smaller encryption key sizes reduces the encryption quality of the encryption of the input data 119. In some embodiments, if the TRNG circuit 80 is performing at a high level and able to output random bits without any problems, then a smaller encryption key size (e.g., 128 bits) may be implemented by the DRNG 100.

However, if a problem is detected with the performance of TRNG circuit 80, the DRNG 100 can be dynamically reconfigured to produce larger encryption keys to improve the quality of the encryption process. The RNG post-processor 90 may compute a quality metric for the RNG circuit. In one example, the RNG post-processor 90 may include a buffer for storage of bits from the TRNG circuit 80 before the RNG post-processor 90 releases the bits to the de-multiplexer 102 as part of the random bit stream 92. The RNG post-processor 90 may perform any of a variety of tests on the bits in its internal buffer to check the quality of the randomness of the bits. One test may include a count of the number of 1's and the number of 0's and determining whether the number of 1's approximately equals the number of 0's (e.g., within a predetermined threshold of being equal in number)—else the quality of the output of the TRNG circuit 80 is considered lower. Further, the number of bit "flips" between consecutive bits may be counted (i.e., a 0 followed by a 1 or 1 followed by a 0) and the RNG post-processor 90 may confirm that approximately 50% of the time, the bits are flipped and 50% of the bits remain the same—otherwise, the quality is determined to be lower. Either or both or additional tests may be performed by the RNG post-processor 90 and the quality metric may be computed based on the results. For example, the number of 1's in the buffer relative to the number of 0's or the relative percentage of bit flips may map to a particular quality metric value.

In response to the computed quality metric for the TRNG circuit 80 falling below a threshold, the RNG post-processor 90 may submit updated configuration values (e.g., M and N) to the configuration registers 132 of the de-multiplexer 102. The values may be updated so as to cause the de-multiplexer to increase the number of bits used for generation of the key encryption relative to the bits to be encrypted.

Table I below shows various examples of encryption modes configurable by the DRNG 100.

TABLE I

ENCRYPTION MODES

| Encryp. mode | Key size | Data block size | No. of TRNG bits | M | N | Ratio of TRNG bits used to PRNG output |
|---|---|---|---|---|---|---|
| 128b | 128b | 128b | 256b | 2 | 2 | 2:1 |
| 192b | 192b | 128b | 320b | 2 | 3 | 2.5:1 |
| 256b | 256b | 128b | 384b | 2 | 4 | 3:1 |

Examples of three encryption modes are illustrated in Table I—128 bit encryption, 192 bit encryption, and 256 bit encryption. The encryption mode designations refer to the sizes of the encryption keys used in each respective mode. For example, a key size of 128 bits is used to implement the 128 bit encryption mode, while key sizes of 192 bits and 256 bits is used to implement the 192 bit and 256 bit encryption modes, respectively. In the example of FIG. 1, the size of the data blocks from buffer B to be encrypted as input data 119 is 16 bytes, or 128 bits.

The column in Table I labeled "No. of TRNG bits" includes the number of bits from the random bit stream needed to generate a new encryption key and provide enough bits for a complete block of input data to be encrypted. The number of TRNG bits needed is the sum of the previous two column—key size and data block size. For example, 256 TRNG bits are needed in order to form a 128 bit key and have 128 bits of data to be encrypted. The last row in Table I illustrates that 384 bits are needed to generate a 256 bit key and also have 128 bits of data to be encrypted. The columns designated as "M" and "N" refer to the relative number of bits from the random number bit stream that are to be used to generate the block of data to be encrypted and to generate an encryption key. The values of M and N in the first row of the table are 2 each meaning that equal numbers of bits from the random bit stream are provided to the key generator 106 as to the encryption engine 120. The values may be stored in the configuration registers 132 and can be any suitable, yet equal numbers (1, 2, 3, etc.). With M and N both equal to 2, the ratio of TRNG bits used to generate PRNG output is 2:1 meaning that for every 2 bits in the random bit stream 92 generated by the TRNG circuit 80, the DRNG 100 generates 1 random output bit—the other bit used of course to generate the encryption key. In the second row, M is 2 and N is 3 which results in 3 bits being stored in buffer A for use by the key generator for every 2 bits stored in buffer B to subsequently be encrypted by the encryption engine 120. As a result, the ratio of TRNG bits used to generate PRNG output is 2.5:1 meaning that on average for every 2.5 bits from the random bit stream 92 generated by the TRNG circuit 80, the DRNG 100 generates 1 random output bit. The DRNG 100 thus generates fewer bits of random output using the random bit stream 92, but does so with a larger encryption key size which increases the quality of the encryption process. In the third row, M is 2 and N is 4 which results in 4 bits being stored in buffer A for use by the key generator for every 2 bits stored in buffer B to subsequently be encrypted by the encryption engine 120. As a result, the ratio of TRNG bits used to generate PRNG output is 3:1 meaning that for every 3 bits from the random bit stream 92 generated by the TRNG circuit 80, the DRNG 100 generates 1 random output bit. The generation of random output bits from DRNG 100 is lowest with this configuration (compared to the configurations of the first two rows in Table I), but the encryption process is highest as 256 bit encryption is being performed.

Figure 7:
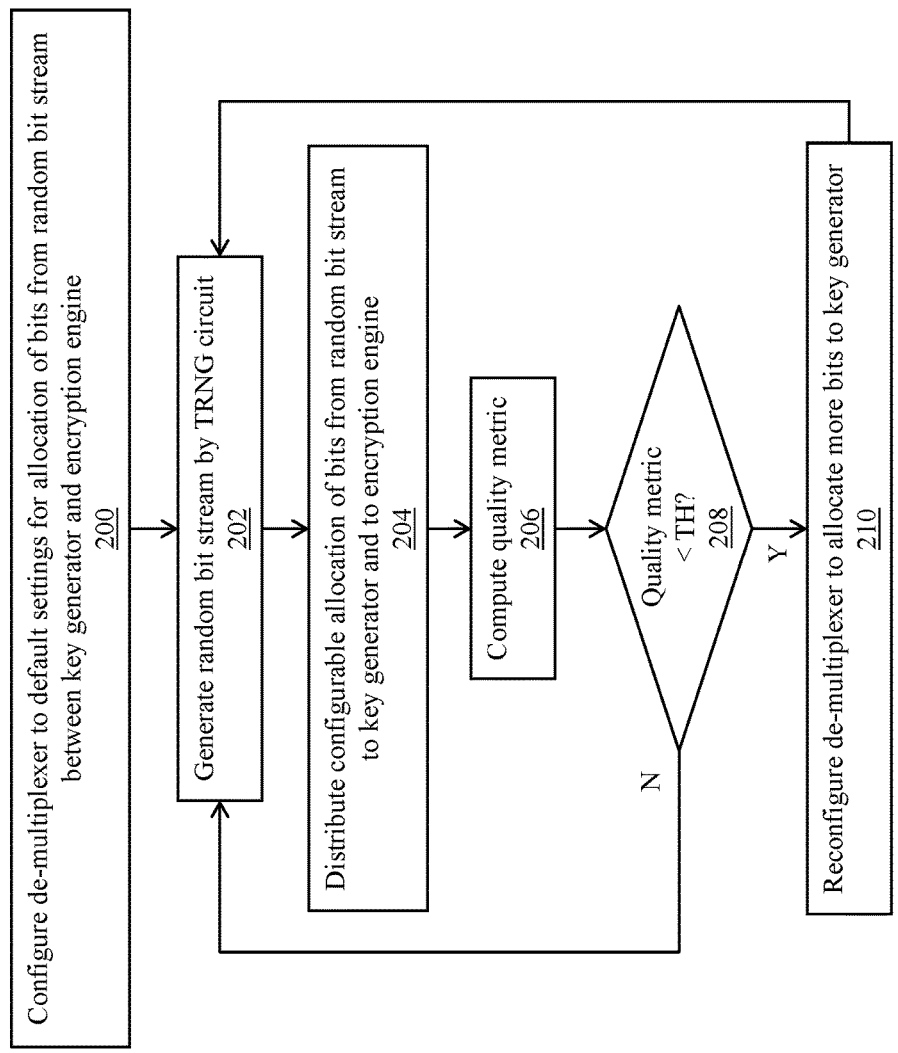
FIG. 7 shows a method in accordance with various examples.

FIG. 7 shows a method in accordance with various embodiments. The operations can be performed in the order shown or in a different order. Further, the operations may be performed sequentially, or two or more of the operations may be performed concurrently. At 200, the method includes configuring the de-multiplexer 102 to default settings for allocation of bits from the random bit stream 92 between the key generator 106 and the encryption engine 120. The default configuration settings may comprise initial values of M and N that are pre-stored in the configuration registers 132 or elsewhere in, or accessible by, the DRNG 100. In some embodiments, the default settings may comprise values that result in the smallest encryption key size (e.g., 128 bits), but can be other values as well. In some cases, the default settings may be applied to the de-multiplexer 102 during system initialization such as upon power up of the random number generation system 70 or a system that includes the random number generation system 70. In some embodiments, configuring the de-multiplexer 102 to the default settings may comprise configuring a state machine to operate the switch 130 so as to distribute the appropriate number of bits to each of the buffers A and B.

At 202, the method includes generating the random bit stream 92 by the TRNG circuit 80. This operation may comprise powering up the TRNG circuit, enabling its output, etc. At 204, the method also may include distributing the configurable allocation of bits from the random bit stream to buffer A (and thus indirectly to the key generator 106) and to buffer B (and thus indirectly to the encryption engine 120).

At 206, the method includes computing a quality metric. The quality metric may be computed by the RNG post-processor 90 and may indicate the quality of the random bit stream produced by the TRNG circuit 80. Examples of quality metrics are provided above. As long as the quality metric remains above a threshold value, (as determined at 208), the process loops back to operation 202 and the process of generating the random bit stream, distributing bits from the bit stream between the key generator 106 and the encryption engine and computing a new quality metric repeats. If, however, the quality metric drops below a threshold (which may be preconfigured into the RNG post-processor 90), then at 210 the RNG post-processor reconfigures the de-multiplexer 102 to allocate more bits from the random bit stream for use by the key generator 106 to generate larger encryption keys. Once the de-multiplexer 102 has been reconfigured, control loops back to operation 202. Operations 206-210 may be performed by the RNG post-processor 90. The method may further comprise encrypting bits from the random bit stream to produce an encrypted output value using an encryption key generated by the key generator, and the encrypted output value may be used for various cryptographic applications as explained above.

The embodiment in FIG. 7 illustrates how the random number generation system 70 may react to a drop in performance of the TRNG circuit 80. The de-multiplexer 102 of the DRNG 100 may be dynamically configured in response to a drop in the quality metric. At some point thereafter, the performance of the TRNG circuit 80 may improve and thus the quality metric may increase and eventually exceed the threshold noted in operation 208, or another threshold value. In response to the quality metric subsequently exceeding a threshold (as detected by the RNG post-processor 102), the RNG post-processor may again reconfigure the de-multiplexer to allocate fewer bits from the random bit stream 92 for use in computing encryption keys.

The disclosed embodiments provide one or more of the following benefits. For example, a temporary failure of the TRNG circuit 80 (e.g., the TRNG circuit generates a deterministic value) can be masked because the DRNG 100 generates an unpredictable output using encryption and feedback mechanisms as described above. Further, the rate of reseeding the encryption engine is non-constant and may be determined by the rate at which the TRNG circuit 80 is able to generate random bits. The random number generator system 70 has no restriction on the maximum number of bits per request for a random number nor on the minimum or maximum time between TRNG reseeds of the DRNG 100. As such, the system comprises a "plug and play" architecture in which DRNG 100 is inserted after a TRNG circuit. Further still, the random number generator system 70 effectively accumulates entropy. For example, the amount of entropy per bit may be 0.5 meaning that the TRNG circuit 80 generates 64 truly random bits out of 128 bits generated. In this case, the random number generator system 70 can be configured to reload a 256-bit key every two encryption processes thereby effectively sampling 2×128+256 entropy bits for every two encryption cycles, which will result in 2×128 output bits with an entropy per bit of 1 instead of 0.5.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An integrated circuit (IC), comprising:
   a first entropy-based random number generator (RNG) circuit configured to produce a bit stream;
   a key storage device configured to store an encryption key;
   a de-multiplexer including first and second buffers and configured to receive the bit stream from the first entropy-based RNG circuit for storage among the first and second buffers, wherein the de-multiplexer is configured to provide N bits of the bit stream to the first buffer for every M bits of the bit stream provided by the de-multiplexer to the second buffer, wherein values of M and N are configurable;
   first exclusive-OR logic configured to iteratively determine an exclusive-OR of bits from the first buffer stream with a previous encryption key from the key storage device to generate a new encryption key and to store the new encryption key in the key storage device;
   an encryption engine configured to encrypt bits from the second buffer using an encryption key from the key storage device.

2. The IC of claim 1 further comprising an RNG post-processing circuit coupled between the first entropy-based RNG circuit and the de-multiplexer and configured to:
   determine a quality metric for the first entropy-based RNG circuit; and
   configure the values of M and N responsive to the determined quality metric.

3. The IC of claim 2, wherein responsive to the quality metric falling below a threshold, the RNG post-processing circuit is configured to increase the value of N to provide an increased number of bits to the exclusive-OR gate for generation of longer encryption keys.

4. The IC of claim 1, further comprising second exclusive-OR logic and wherein the encryption engine is configured to implement advanced encryption standard (AES) encryption with cipher block chaining in which a block of bits from the second buffer is provided to the second exclusive-OR logic to be exclusive-OR'd with a previous output from the encryption engine to produce input data, and wherein the input data is then encrypted by the encryption engine using the encryption key from the key generator to produce a new output.

5. The IC of claim 1, wherein the key storage device is configured to be initialized with an initial value generated by a second entropy-based RNG circuit.

6. A system, comprising:
   a first entropy-based random number generator (RNG) circuit configured to produce a bit stream;
   a key generator;
   an encryption engine;
   a de-multiplexer configured to receive the bit stream from the first entropy-based RNG circuit, to provide a first set of bits from the bit stream to the key generator for generation of an encryption key, and to provide a second set of bits from the bit stream to the encryption engine for encryption to produce an encrypted output value; and
   an RNG post-processing circuit coupled between the first entropy-based RNG circuit and the de-multiplexer, the RNG post-processing circuit configured to determine a value for the first entropy-based RNG circuit, and responsive to the value, to configure the de-multiplexer as to which bits from the bit stream are to be provided in the first set of bits and which bits from the bit stream are to be provided in the second set of bits.

7. The system of claim 6, wherein the key generator includes a logical operator circuit and a storage device, wherein the logical operator circuit is configured to combine the first set of bits with a previously generated encryption key from the storage device to generate a new encryption key and to store the new encryption key in the storage device in place of the previously generated encryption key.

8. The system of claim 7, wherein the logical operator circuit includes an exclusive-OR logical operator circuit or an exclusive-NOR logical operator circuit.

9. The system of claim 6, wherein the de-multiplexer includes switch logic, a first buffer and a second buffer, wherein the switch logic is configured to distribute the first set of bits to the first buffer and to distribute the second set of bits to the second buffer.

10. The system of claim 9, wherein the de-multiplexer includes a storage register configured to store a configuration value used by the switch logic to determine which bits of the bit stream are to be included as the first set and which bits are to be included as the second set.

11. The system of claim 6, wherein the value includes a quality metric for the first entropy-based RNG circuit.

12. The system of claim 6, wherein responsive to the value falling below a threshold, the RNG post-processing circuit is configured to re-configure the de-multiplexer so that more bits from the bit stream are provided in the first set of bits relative to the bits provided in the second set of bits.

13. The system of claim 6, wherein responsive to the value exceeding a threshold, the RNG post-processing circuit is configured to re-configure de-multiplexer so that fewer bits from the bit stream are provided in the first set of bits relative to the bits provided in the second set of bits.

14. The system of claim 6, wherein the first entropy-based RNG circuit comprises a ring oscillator or a bistable cell.

15. The system of claim 6, wherein the system is a central processing unit, a system-on-chip (SoC), a field-programmable gate array (FPGA), or an application-specific integrated circuit (ASIC).

16. A method, comprising:
configuring a de-multiplexer to default settings for allocation of bits from a random bit stream between a key generator and an encryption engine;
generating the random bit stream by a true random number generator (TRNG) circuit;
responsive to the default settings, distributing bits from the random bit stream to the key generator and to the encryption engine;
determining that a quality metric of the TRNG circuit is below a first threshold;
reconfiguring the de-multiplexer to allocate an increased number of bits from the random bit stream to the key generator;
generating, by the key generator, an encryption key using the bits distributed from the random bit stream to the key generator; and
encrypting, by the encryption engine, the bits distributed from the random bit stream to the encryption engine using the generated encryption key.

17. The method of claim 16, wherein generating the encryption key comprises exclusive-OR'ing a previously generated encryption key with the bits distributed from the random bit stream to the key generator.

18. The method of claim 16, wherein encrypting the bits distributed from the random bit stream to the encryption engine comprises: exclusive-OR'ing a previously encrypted output from the encryption engine with the bits distributed from the random bit stream to the encryption engine to produce an input value; and encrypting the input value to produce a new encrypted output.

19. The method of claim 16 further comprising iteratively determining the quality metric and, responsive to the quality metric exceeding a second threshold, re-configuring the de-multiplexer to decrease the number of bits allocated from the bit stream to the key generator.

* * * * *